US012590762B2

(12) United States Patent
Chen et al.

(10) Patent No.: US 12,590,762 B2
(45) Date of Patent: Mar. 31, 2026

(54) SHUTTLE KILN WITH ENHANCED RADIANT HEAT RETENTION

(71) Applicant: CORNING INCORPORATED, Corning, NY (US)

(72) Inventors: Peng Chen, Pittsburgh, PA (US); Pravin Anant Rajeshirke, Pune (IN); Mayur Vitthal Selokar, Pune (IN)

(73) Assignee: CORNING INCORPORATED, Corning, NY (US)

( * ) Notice: Subject to any disclaimer, the term of this patent is extended or adjusted under 35 U.S.C. 154(b) by 1125 days.

(21) Appl. No.: 17/624,367

(22) PCT Filed: Jun. 24, 2020

(86) PCT No.: PCT/US2020/039254
§ 371 (c)(1),
(2) Date: Jan. 3, 2022

(87) PCT Pub. No.: WO2021/003045
PCT Pub. Date: Jan. 7, 2021

(65) Prior Publication Data

US 2022/0357105 A1 Nov. 10, 2022

Related U.S. Application Data

(60) Provisional application No. 62/870,236, filed on Jul. 3, 2019.

(51) Int. Cl.
*F27B 9/26* (2006.01)
*F27B 9/30* (2006.01)
*F27D 7/02* (2006.01)

(52) U.S. Cl.
CPC .............. *F27B 9/26* (2013.01); *F27B 9/3011* (2013.01); *F27D 2007/026* (2013.01)

(58) Field of Classification Search
CPC .. F27D 17/002; F27D 17/001; F27D 99/0033; F27D 7/04; F27D 2007/026;
(Continued)

(56) References Cited

U.S. PATENT DOCUMENTS 4,365,986 A 12/1982 Nayak
4,616,997 A * 10/1986 Ross .......................... F27D 7/04 432/144
(Continued)

FOREIGN PATENT DOCUMENTS

CN 104677119 A 6/2015
CN 206570198 U 10/2017
(Continued)

OTHER PUBLICATIONS

International Search Report and Written Opinion of the International Searching Authority; PCT/US2020/039254; dated Aug. 6, 2020; pp. 12; European Patent Office.

*Primary Examiner* — Edward F Landrum
*Assistant Examiner* — Kuangyue Chen

(57) ABSTRACT

A shuttle kiln according to certain aspects includes at least one flue channel and multiple flue risers in fluid communication with the flue channel, and at least one shuttle defining multiple exhaust shafts arranged above the multiple flue risers, wherein at least one radiation blockers is arranged above outlet ports of the at least one shuttle. Such a configuration blocks line-of-sight radiant heat transfer between (i) heated surfaces above the shuttle within the kiln housing and (ii) outlet ports of the exhaust shafts, thereby enhancing radiant heat retention and reducing temperature variability within a kiln cavity of the shuttle kiln.

14 Claims, 16 Drawing Sheets

(58) Field of Classification Search
CPC ........................ F27B 17/0083; F27B 17/0016; F27B 9/3005; F27B 9/30; F27B 9/3011; F27B 9/10; F27B 9/26; F27B 2009/3016; F27B 2009/3066; Y02P 40/60
See application file for complete search history.

(56) References Cited

U.S. PATENT DOCUMENTS

| | | | | |
|---|---|---|---|---|
| 5,004,519 | A | 4/1991 | Hariri | |
| 6,107,614 | A * | 8/2000 | Linn ........................ | F27B 9/029 432/244 |
| 2012/0240424 | A1* | 9/2012 | Sugihara ................ | B23K 1/012 34/79 |
| 2015/0050610 | A1 | 2/2015 | Ernst et al. | |

FOREIGN PATENT DOCUMENTS

| | | | | |
|---|---|---|---|---|
| EP | 0197212 | B1 | | 6/1989 |
| EP | 2658675 | B1 | | 5/2018 |
| GB | 0908606 | A | * | 10/1960 |
| JP | 2001-324273 | A | | 11/2001 |

* cited by examiner

SHUTTLE KILN WITH ENHANCED RADIANT HEAT RETENTION

CROSS-REFERENCE TO RELATED APPLICATIONS

This is a national stage application under 35 U.S.C. § 371 of International Application No. PCT/US2020/039254, filed on Jun. 24, 2020, which claims the benefit of priority under 35 U.S.C § 120 of U.S. Provisional Application Ser. No. 62/870,236 filed on Jul. 3, 2019, the content of which is relied upon and incorporated herein by reference in its their entireties.

BACKGROUND

The disclosure relates to shuttle kilns for producing fired bodies, and more particularly to shuttle kilns that exhibit reduced radiation heat loss, thereby enhancing radiant heat retention and enhancing temperature uniformity.

Shuttle kilns are typically used for batch processing of products (e.g., ceramics) at elevated temperatures. A shuttle kiln may include a kiln housing and one or more shuttles that in combination form a kiln cavity. Temperature variations in a kiln cavity (e.g., from a center an edge of the kiln cavity) can produce significant differences in the specifications and quality of fired products, depending on where a fired product was located within the kiln cavity during a firing process. Batch processing for sensitive applications may require increased temperature control and uniformity within the kiln cavity to provide consistent results and higher yields. For example, in certain applications, fired products (e.g., porous ceramic products containing organic matter) within a batch may exhibit different significant dimensional variation due to experience non-uniform part shrinkages in the firing process, based on exposure of the products to different maximum temperatures depending on where the products were located within a kiln cavity.

One such potential source of temperature variation within a kiln cavity is cold regions at exhaust shafts of shuttles due to radiation heat loss. Flue gas dilution creates cold regions below the shuttle that provide radiation heat transfer interaction with the hotter regions above the shuttle, resulting in radiation heat loss. Need therefore exists in the art for shuttle kiln exhaust systems that address limitations associated with conventional systems.

SUMMARY

A shuttle kiln according to certain aspects includes at least one flue channel and multiple flue risers in fluid communication with the flue channel, and at least one shuttle defining multiple exhaust shafts arranged above the multiple flue risers, wherein at least one radiation blocker is arranged above outlet ports of the at least one shuttle. Such a configuration blocks line-of-sight radiant heat transfer between (i) heated surfaces above the shuttle within the kiln housing and (ii) outlet ports of the exhaust shafts, thereby reducing temperature variability within a kiln cavity of the shuttle kiln.

In one aspect, the present disclosure relates to a shuttle kiln including a shuttle and a radiation blocker. The shuttle is configured to be removably positioned within an interior of the kiln housing. The shuttle includes at least one exhaust shaft having an inlet port and an outlet port arranged below the inlet port. The at least one exhaust shaft is configured to be positioned above and in fluid communication with at least one flue riser of the kiln housing, with the at least one exhaust shaft configured to be separated from the at least one flue riser to define an entrainment gap therebetween. The radiation blocker is positioned above the outlet port of the at least one exhaust shaft to block line-of-sight radiant heat transfer between (i) any heated surface above the shuttle within the kiln housing and (ii) the outlet port of the at least one exhaust shaft.

In certain embodiments, the shuttle kiln further includes the kiln housing, which includes at least one flue channel and the at least one flue riser in fluid communication with the at least one flue channel. In certain embodiments, the kiln housing includes a floor, a door, sidewalls, and a ceiling bounding the interior. The at least one flue channel is arranged below a top surface of the floor. The at least one flue riser extends above the top surface of the floor. In certain embodiments, at least a portion of the at least one exhaust shaft is vertically aligned with the at least one flue riser.

In certain embodiments, the shuttle kiln further includes furniture positioned on the shuttle and defining a plurality of support surfaces configured to support a plurality of unfired bodies to be fired within the shuttle kiln. In certain embodiments, the shuttle kiln further includes at least one radiation shielding grid arranged within the at least one exhaust shaft. In certain embodiments, the at least one radiation shielding grid extends between the inlet port and the outlet port of the at least one exhaust shaft. In certain embodiments, at least a portion of the at least one exhaust shaft includes a tapered sidewall proximate to the inlet port.

In certain embodiments, the radiation blocker includes a shielding wall portion of the at least one exhaust shaft, with the shielding wall portion being non-perpendicular to an upper surface of the shuttle. In certain embodiments, the shielding wall portion defines a bend in the at least one exhaust shaft. In certain embodiments, the outlet port of the at least one exhaust shaft is laterally offset relative to the inlet port.

In certain embodiments, the radiation blocker includes at least one radiation shield positioned above the inlet port of the at least one exhaust shaft of the shuttle. In certain embodiments, the radiation blocker further includes at least one support to elevate the at least one radiation shield above the inlet port of the at least one exhaust shaft of the shuttle. In certain embodiments, the radiation blocker further includes the at least one support attached to furniture positioned on the shuttle to suspend the at least one radiation shield above the inlet port of the at least one exhaust shaft of the shuttle. In certain embodiments, a projected top area of the at least one radiation shield is at least as large as a cross-sectional area of the inlet port of the at least one exhaust shaft of the shuttle. In certain embodiments, the projected top area of the at least one radiation shield is in a range of from 0.09 $m^2$ to 0.21 $m^2$, and a cross-sectional area of the inlet port of the at least one exhaust shaft of the shuttle in a range of from 0.09 $m^2$ to 0.21 $m^2$. In certain embodiments, the at least one radiation shield includes a tapered bottom surface. In certain embodiments, the at least one radiation shield includes a conical or trapezoidal bottom surface.

In another aspect, the present disclosure relates to a method of fabricating at least one fired body. The method includes moving at least one shuttle carrying at least one unfired body into a kiln housing of a shuttle kiln. The method further includes arranging at least one exhaust shaft of the at least one shuttle above at least one flue riser in the kiln housing. The method further includes heating a kiln cavity bounded by the at least one shuttle and the kiln housing to alter the at least one unfired body. The method further includes shielding radiation using a radiation blocker positioned above an outlet port of the at least one exhaust shaft to block line-of-sight radiant heat transfer between (i) any heated surface above the at least one shuttle within the kiln housing and (ii) the outlet port of the at least one exhaust shaft of the shuttle. The method further includes exhausting gas from the kiln cavity through the at least one exhaust shaft of the shuttle.

In certain embodiments, the radiation blocker includes a shielding wall portion of the at least one exhaust shaft, with the shielding wall portion being non-perpendicular to an upper surface of the shuttle. In certain embodiments, the radiation blocker includes at least one radiation shield positioned above an inlet port of the at least one exhaust shaft of the shuttle. In certain embodiments, the present disclosure relates to a fired body produced by the foregoing method.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
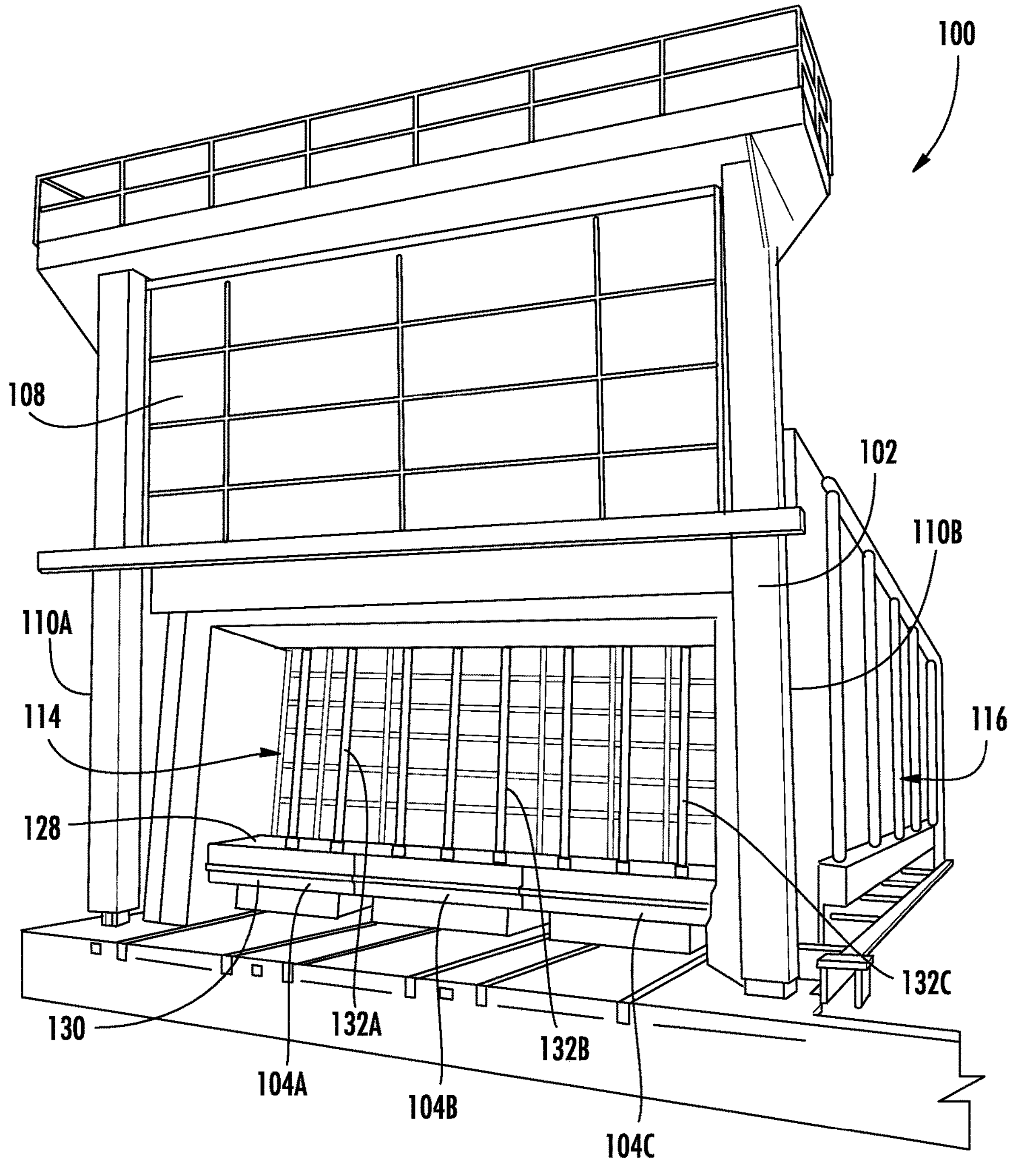
FIG. 1A is a perspective view of a shuttle kiln including a kiln housing and multiple shuttles positioned therein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIGS. 1A-1D are views of a shuttle kiln 100 including a kiln housing 102 and a first shuttle 104A, a second shuttle 104B, and a third shuttle 104C (referred to generally herein as shuttles 104) positioned therein. In certain embodiments, more or fewer shuttles 104 (may also be referred to herein as shuttle cars, kiln cars, kiln carts, etc.) may be used. A shuttle kiln 100 is a type of periodic kiln configured to uniformly heat a kiln cavity 138 bounded in part by the kiln housing 102 to a kiln peak temperature (may also be referred to as a maximum temperature, peak temperature, etc.). The features described herein and below may be applied to other types of periodic kilns.

Figure 1B:
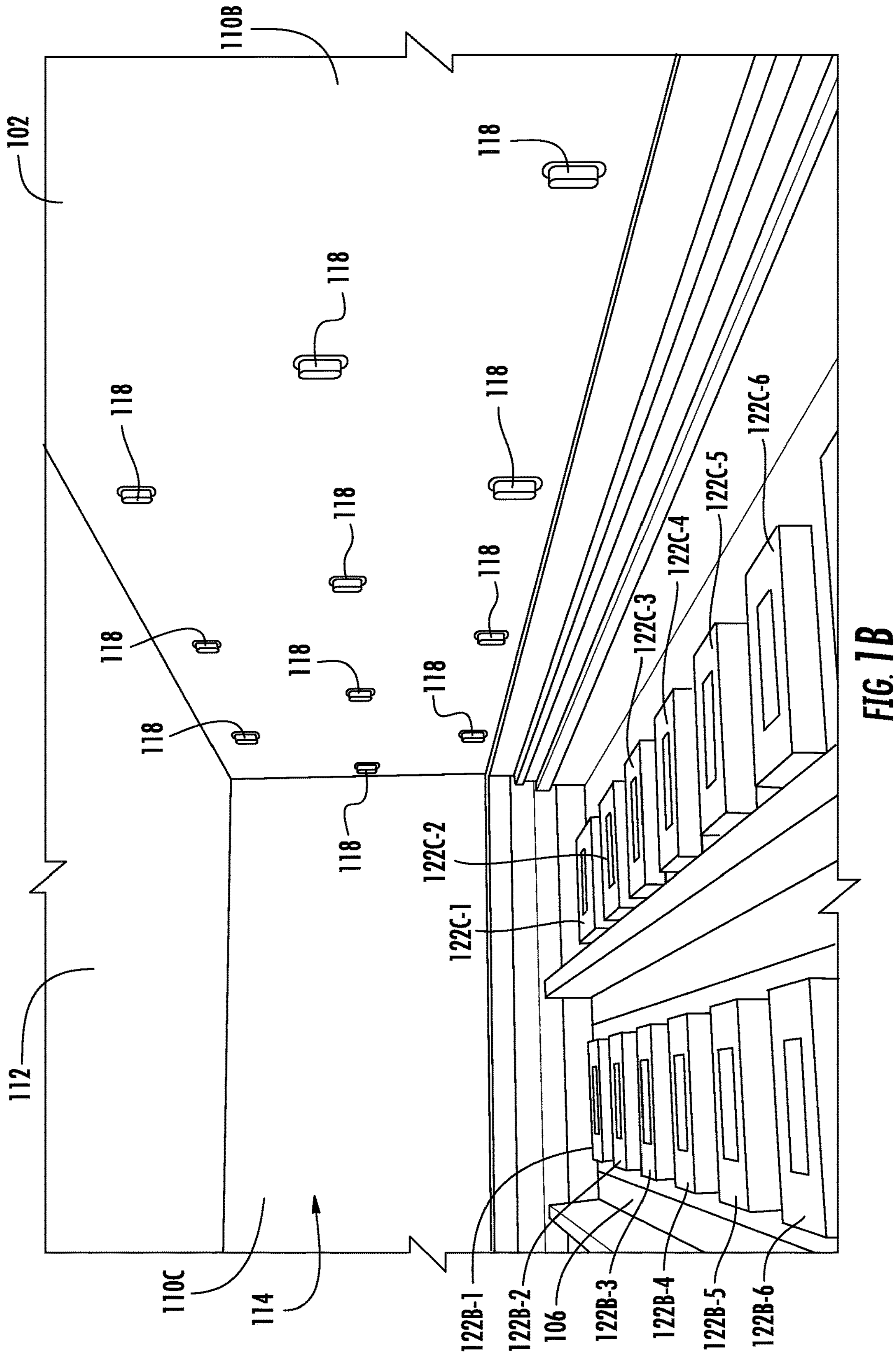
FIG. 1B is a perspective view of an interior of the kiln housing of FIG. 1A.

Referring to FIGS. 1A and 1B, the kiln housing 102 includes a floor 106, a front door 108, a left sidewall 110A, a right sidewall 110B (opposite the left sidewall 110A), a back sidewall 110C (wherein the foregoing left, right, and back sidewalls 110A-110C may be referred to generally herein as sidewalls 110), and a ceiling 112, which bound and define an interior 114 of the kiln housing 102. As shown in FIG. 1A, each shuttle 104A-104C includes a top 128 and a bottom 130 (opposite the top 128). When the shuttles 104 are positioned within the kiln housing 102 and the front door 108 is in the closed position, a kiln cavity 138 is defined between the front door 108, the sidewalls 110, and the ceiling 112 of the kiln housing 102 as well as the top 128 of the shuttle 104. The top 128 of the shuttle 104 serves as a moveable refractory floor that is used as a hearth of the shuttle kiln 100.

The front door 108 of the kiln housing 102 is moveable from a closed position enclosing the interior 114 to an open position allowing insertion of shuttles 104 into, and/or removal of the shuttles 104 from, the interior 114 of the kiln housing 102. The shuttles 104 are configured to carry unfired bodies into the interior 114 of the kiln housing 102 and carry fired bodies out of the interior 114 of the kiln housing 102 (e.g., through the front door 108). In certain embodiments, the kiln housing 102 includes a back door (as well as a front door 108).

The shuttle kiln 100 includes a firing system 116 to heat the kiln cavity 138. The firing system 116 includes a plurality of burners 118 that extend through the left sidewall 110A and right sidewall 110B to heat the kiln cavity 138. In certain embodiments, the plurality of burners 118 may additionally, or alternatively, extend through the ceiling 112. The front door 108, sidewalls 110, and ceiling 112 each include refractory interior surfaces to retain heat produced by the plurality of burners 118 within the kiln cavity 138. The plurality of burners 118 produce hot gas (which may also be referred to herein as flue gas) in the kiln cavity 138.

Figure 1C:
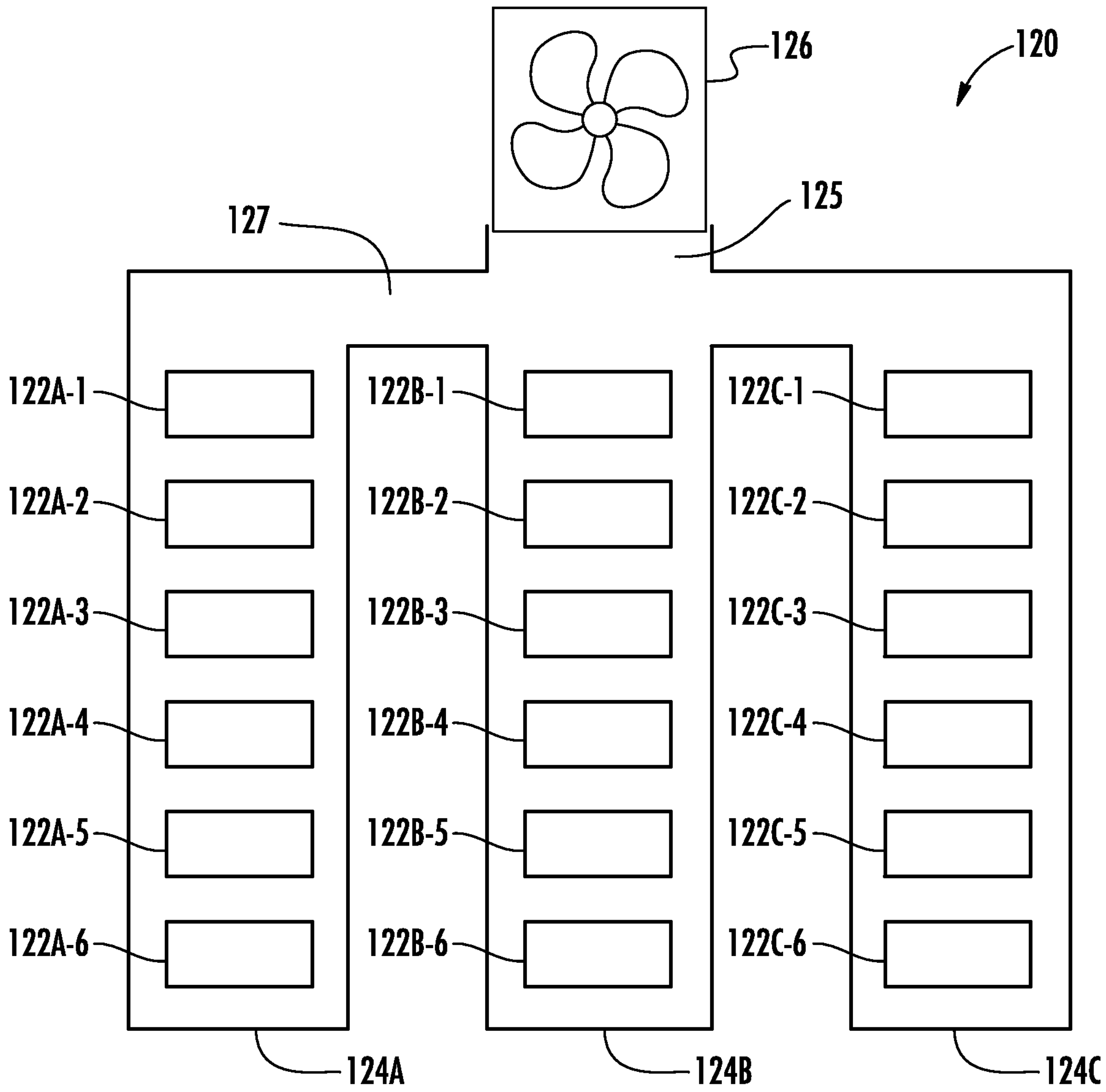
FIG. 1C is a schematic top view of an exhaust system of the shuttle kiln of FIG. 1A including flue channels and an exhaust fan.

Referring to FIGS. 1B and 1C, the shuttle kiln 100 includes an exhaust system 120 to exhaust the hot gas (e.g., flue gas) from the kiln cavity 138. The exhaust system 120 includes a plurality of flue risers 122 extending upward from a top surface of the floor 106 of the kiln housing 102, with the plurality of flue risers 122 being in fluid communication with a plurality of flue channels 124 arranged below a top surface of the floor 106. The flue risers 122 include a first plurality of flue risers 122A in fluid communication with a first flue channel 124A (proximate to the left sidewall 110A), a second plurality of flue risers 122B in fluid communication with a second flue channel 124B, and a third plurality of flue risers 122C in fluid communication with a third flue channel 124C (proximate to the right sidewall 110B). The second plurality of flue risers 122B and the second flue channel 124B are laterally positioned between the first and third plurality of flue risers 122A, 122C and the first and third flue channels 124A, 124C. In certain embodiments, fewer or more flue risers 122 and/or flue channels 124 may be used. As shown in FIG. 1C, the flue channels 124 each lead to a header duct 127 that is arranged to collect fluid gas and supply the flue gas to a fan inlet duct 125.

An exhaust fan 126 associated with the kiln housing 102 receives flue gas supplied from the flue channels 124 to the fan inlet duct 125. The exhaust fan 126 pulls flue gas from the kiln cavity 138 through the flue risers 122, the flue channels 124, the header duct 127, and the fan inlet duct 125. As illustrated, the exhaust fan 126 may be positioned proximate to the second flue channel 124B and proximate to the back sidewall 110C. In certain embodiments, additional exhaust fans 126 may be used. Further, in certain embodiments, one or more exhaust fans may be positioned proximate to the first flue channel 124A and/or the third flue channel 124C. In each flue channel 124A-124C, individual flue risers 122 are arranged at different distances relative to the exhaust fan 126. For example, in each flue channel 124A-124C the respective first flue riser 122A-1, 122B-1, 122C-1 is closer to the exhaust fan 126 than the respective second flue riser 122A-2, 122B-2, 122C-2, etc.

Figure 1D:
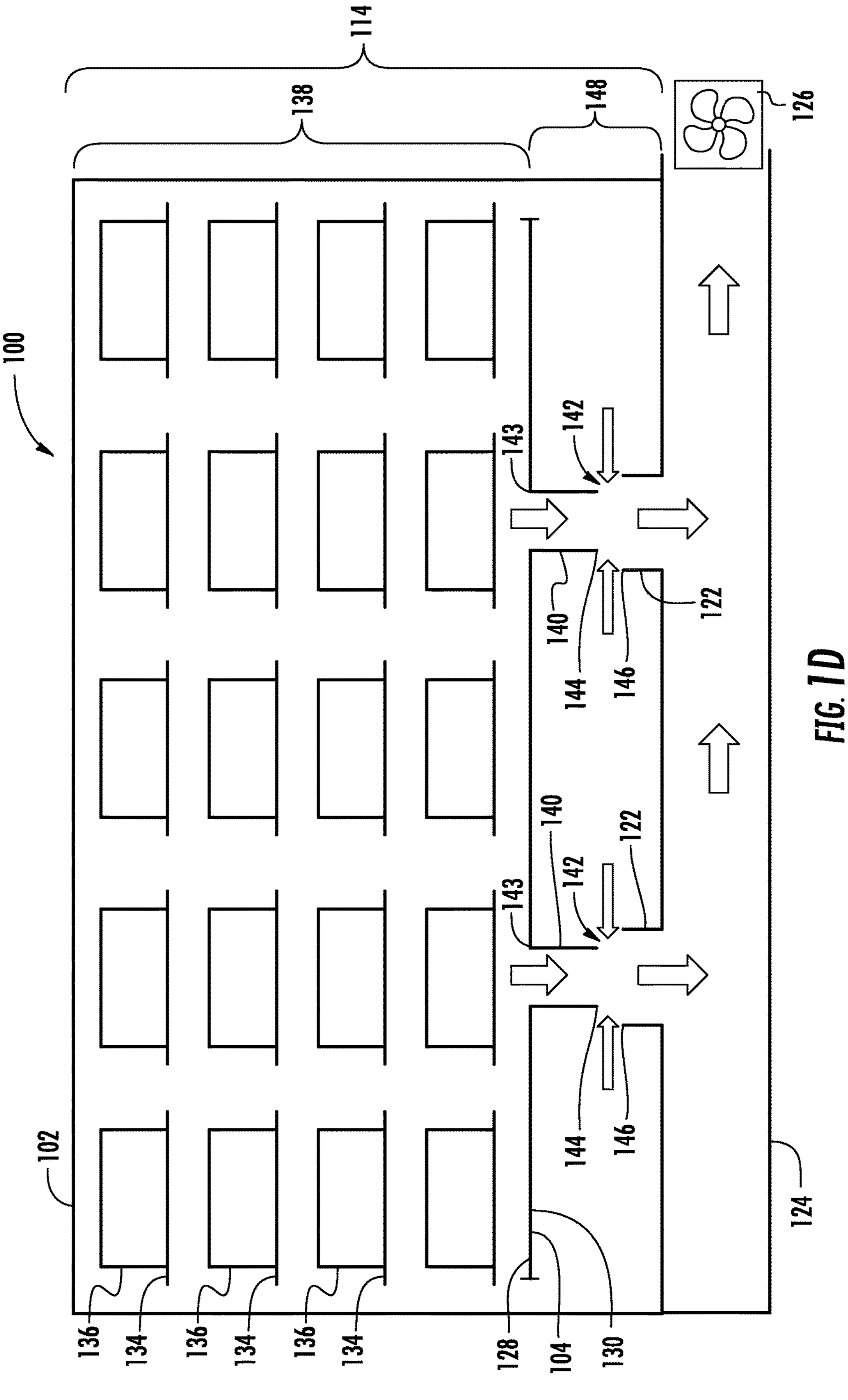
FIG. 1D is a schematic side view of the shuttle kiln of FIG. 1A including exhaust ports of the shuttle in fluid communication with flue risers of the kiln housing.

Referring to FIGS. 1A and 1D, each shuttle 104 is configured to carry furniture 132 positioned on the shuttle 104. In certain embodiments, the first shuttle 104A carries first furniture 132A, the second shuttle 104B carries second furniture 132B, and the third shuttle 104C carries third furniture 132C. The furniture 132 defines a plurality of support surfaces 134 configured to support a plurality of bodies 136 (e.g., unfired bodies prior to firing, fired bodies after firing, etc.). In certain embodiments, the furniture 132 may resemble shelving units, with upstanding columns or posts supporting multiple shelf-like support surfaces 134 arranged at different heights.

Each shuttle 104 includes a plurality of exhaust shafts 140 (which may also be referred to herein as offtakes) that extend from the top 128 to the bottom 130 of the shuttles 104. The exhaust shafts 140 extend through the shuttle 104 to exhaust hot gas from the kiln cavity 138 above the shuttle 104 to the flue risers 122 below the shuttle 104. When the shuttle 104 is positioned within the interior 114 of the kiln housing 102, each exhaust shaft 140 is arranged above and in fluid communication with a respective one of the plurality of flue risers 122, and each exhaust shaft 140 is vertically aligned with at least a portion of one of the plurality of flue risers 122. In other words, when the shuttle 104 is positioned within the interior 114 of the kiln housing 102, at least a portion of each flue riser 122 is arranged below a respective exhaust shaft of the shuttle 104. In certain embodiments, the first shuttle 104A includes a first plurality of exhaust shafts 140 that align with the first plurality of flue risers 122A (which are in fluid communication with the first flue channel 124A), the second shuttle 104B includes a second plurality of exhaust shafts 140 that align with the second plurality of flue risers 122B (which are in fluid communication with the second flue channel 124B), and the third shuttle 104C includes a third plurality of exhaust shafts 140 that align with the third plurality of flue risers 122C (which are in fluid communication with the third flue channel 124C). In certain embodiments, exhaust shafts of multiple shuttles 104 (with the shuttles arrange front to back) may be aligned with flue risers 122 associated with one flue channel 124. For example, in certain embodiments, an exhaust shaft 140 of a first shuttle 104 may be aligned with a first flue riser 122A-1 of the first flue channel 124A and an exhaust shaft 140 of a second shuttle 104 may be aligned with a seventh flue riser 122A-7 of the first flue channel 124A.

The exhaust shafts 140 are vertically aligned with at least portions of the flue risers 122 to place the exhaust shafts 140 in fluid communication with the flue risers 122. Restated, at least a portion of each exhaust shaft 140 may be vertically aligned with a respective one of the flue risers 122. As the shuttle 104 is movable relative to the floor 106 of the kiln housing 102 (and relative to the flue risers 122), the exhaust shafts 140 are not directly attached to the flue risers 122. The exhaust shafts 140 each include an inlet port 143 at the top 128 of the shuttle 104, and an outlet port 144 at the bottom 130 of the shuttle 104. In each instance, the outlet port 144 is arranged below the inlet port 143. Entrainment gaps 142 are defined between outlet ports 144 of the exhaust shafts 140 (at a bottom of each exhaust shaft 140) and inlet ports 146 of the flue risers 122 (at a top of each flue riser 122). In other words, each exhaust shaft 140 is configured to be separated from a corresponding flue riser 122 with an entrainment gap 142 arranged therebetween. As the top 128 of the shuttle 104 has a refractory surface configured to reflect heat upward, cooler gas (e.g., undercar gas or undercar air) in the undercar space 148 beneath the shuttle 104 and above the floor 106 is cooler than the hot gas in the kiln cavity 138 above the shuttle 104. As flue gas exhausts from the exhaust shaft 140 to the flue riser 122, cooler gas is drawn through the entrainment gap 142 into the flue riser 122, due to suction generated by the exhaust fan 126. The cooler gas in the undercar space 148 mixes with and cools the hot gas entering the flue channel 124. In certain embodiments, the exhaust fan 126 is configured to handle gas at a maximum operating temperature, and the cooler gas pulled through the entrainment gap 142 is used to cool the hot gas from the exhaust shaft 140 to a temperature below the maximum operating temperature. The temperature of the gas inside the flue channel 124 is lower than the temperature of the hot gas in the exhaust shafts 140 due to the addition of cooler gas through the entrainment gap 142.

As the cooler gas beneath the shuttle 104 is colder than the hot gas above the shuttle 104, this can cause a radiation heat transfer interaction, which can create non-uniform temperatures within the kiln cavity 138.

Figure 2A:
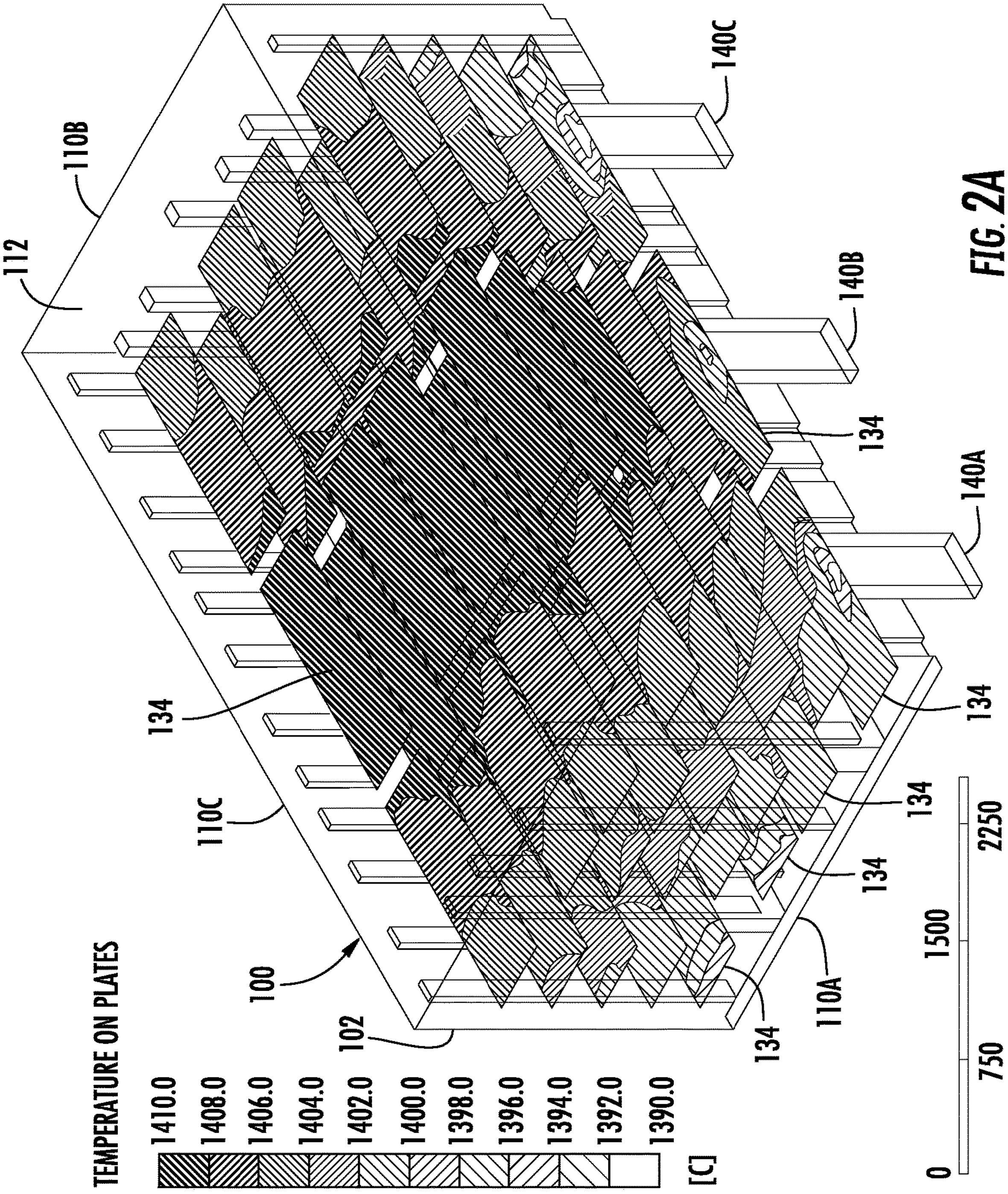
FIG. 2A is a perspective view illustrating radiation heat loss of a shuttle kiln without a radiation blocker.

FIGS. 2A-2D illustrate radiation heat loss of the shuttle kiln 100 without a radiation blocker. FIG. 2A is a partial perspective view illustrating radiation heat loss of the shuttle kiln 100 without a radiation blocker. The heat map shows the peak temperatures experienced by the plurality of support surfaces 134 of furniture 132 within the shuttle kiln 100. The heat map illustrates that the center of the kiln cavity 138 experiences higher peak temperatures, and that there are cold spots produced by the exhaust shafts 140A-140C due to radiation heat loss therethrough. Other sources of heat loss may include air leakages through seals, and/or convective heat loss through sidewalls 110, etc. This temperature non-uniformity can result in non-uniform part shrinkages, as there is a correlation between peak temperature experienced by an unfired body and body shrinkage during the firing process.

Figure 2B:
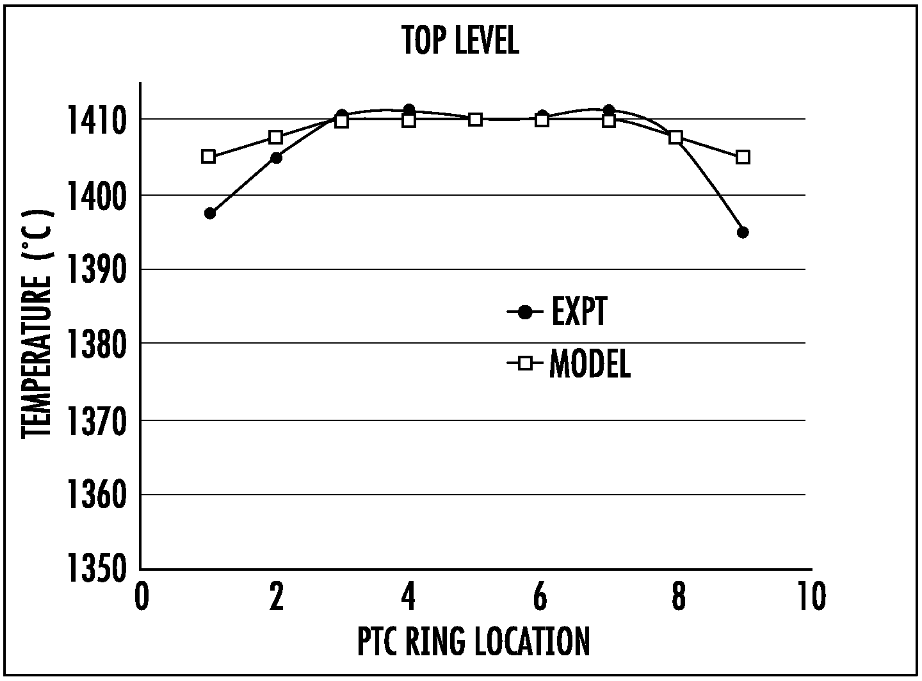
FIG. 2B is a chart illustrating maximum temperature experienced within the shuttle kiln of FIG. 2A at a top of the shuttle kiln.
Figure 2C:
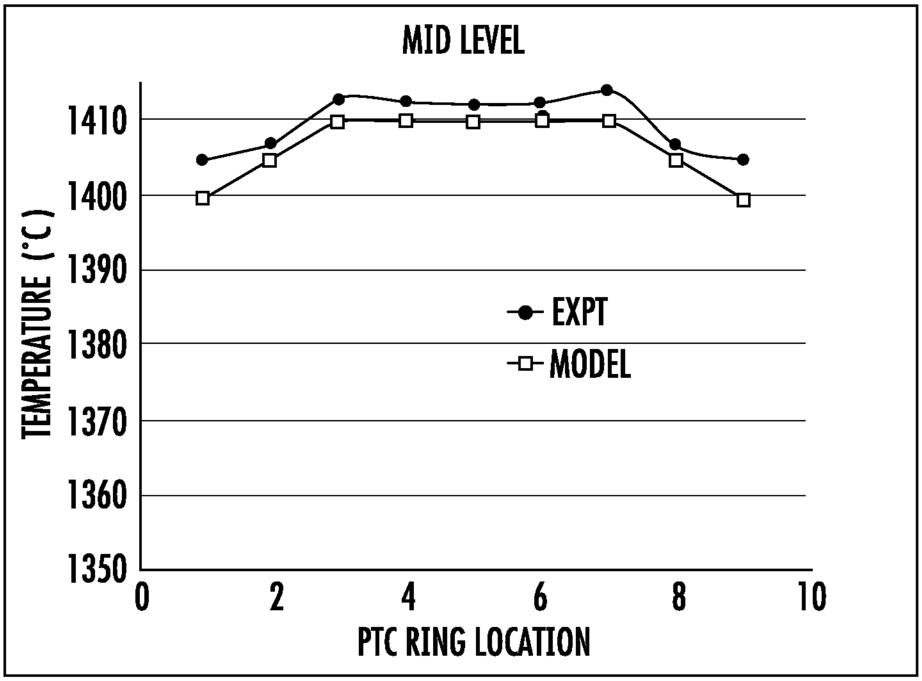
FIG. 2C is a chart illustrating maximum temperature experienced within the shuttle kiln of FIG. 2A at a middle of the shuttle kiln.
Figure 2D:
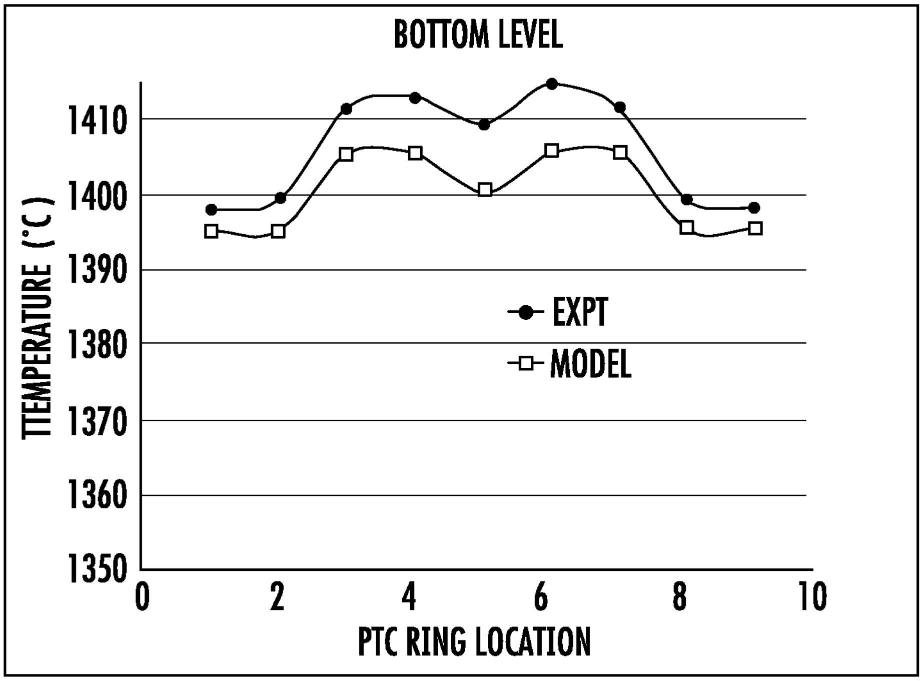
FIG. 2D is a chart illustrating maximum temperature experienced within the shuttle kiln of FIG. 2A at a bottom of the shuttle kiln.

FIGS. 2B-2C are charts illustrating maximum temperature experienced within the shuttle kiln 100 at each of a top, middle, and lower level, between the left sidewall 110A and the right sidewall 110B. FIG. 2B is a chart illustrating maximum temperature experienced within the shuttle kiln 100 of FIG. 2A at a top of the shuttle kiln 100 (i.e., proximate to the ceiling 112), and comparing experimental results and model calculations. FIG. 2C is a chart illustrating maximum temperature experienced within the shuttle kiln 100 of FIG. 2A at a middle of the shuttle kiln 100 (i.e., midway between the ceiling 112 of the kiln housing 102 and the top 128 of the shuttle 104), and comparing experimental results and model calculations. FIG. 2D is a chart illustrating maximum temperature experienced within the shuttle kiln 100 of FIG. 2A at a bottom of the shuttle kiln 100 (i.e., proximate to the top 128 of the shuttle 104), and comparing experimental results and model calculations. It is noted that for each of these charts, the experimental results were consistent with the model calculations.

FIG. 2B illustrates a relatively uniform peak temperature across a top of the shuttle kiln 100, but with some temperature drop at the left sidewall 110A and right sidewall 110B. Comparatively, FIG. 2D illustrates dips in peak temperature (partly due to temperature drops proximate to the left sidewall 110A and right sidewall 110B) mainly due to the radiation heat loss at each of the exhaust shafts 140A-140C. The radiation heat loss is one of the reasons why the temperature was less uniform at the bottom than the top of the shuttle kiln 100. In certain instances, temperature non-uniformity could be as high as 25° C.

Figure 3A:
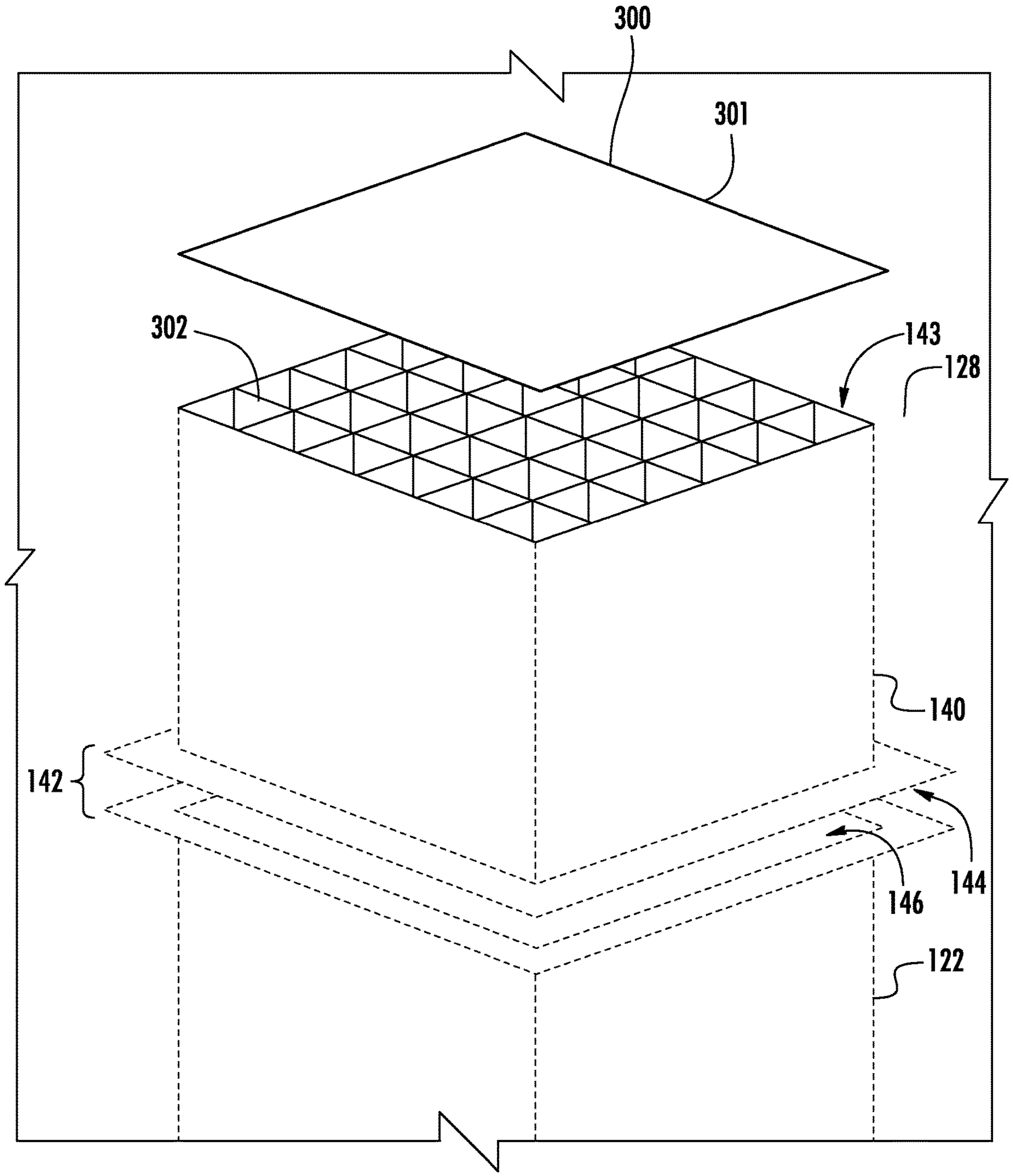
FIG. 3A is a perspective view illustration of a radiation shield of the radiation blocker positioned above an exhaust shaft and a radiation shielding grid of the shuttle kiln of FIG. 1A.
Figure 3C:
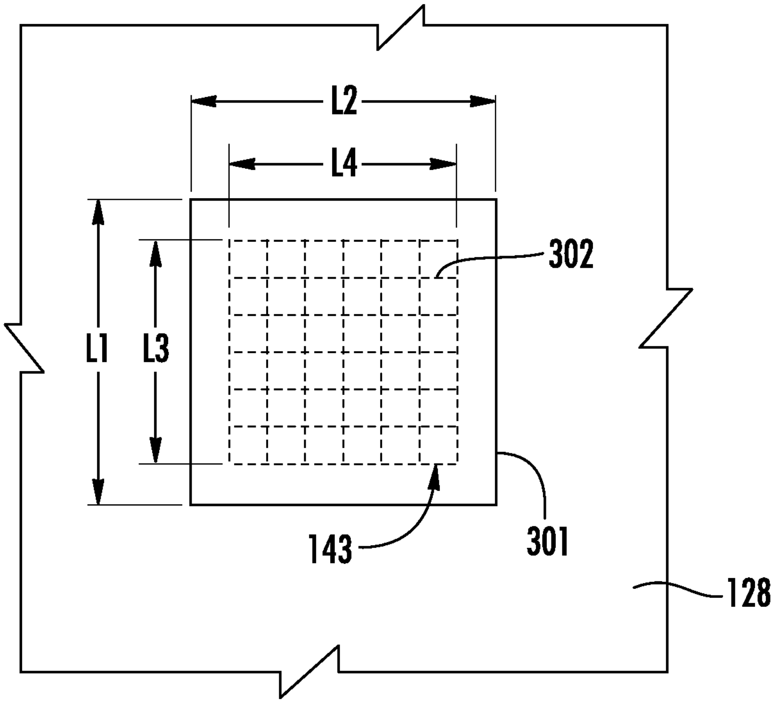
FIG. 3C is a schematic side view of the radiation blocker of FIG. 3A.
Figure 3B:
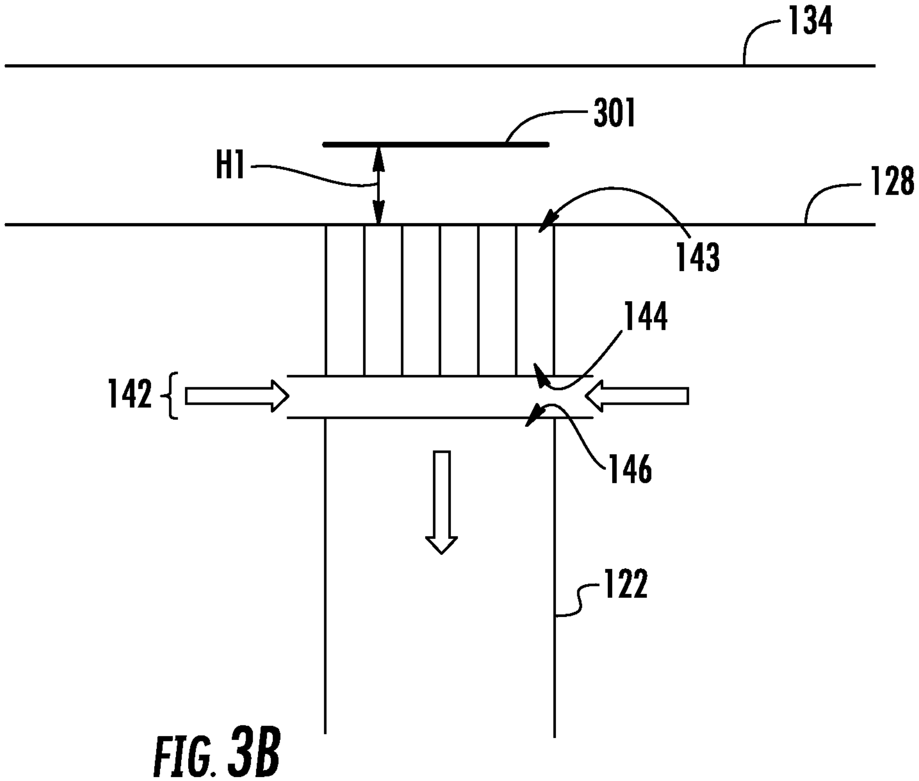
FIG. 3B is a top view of the radiation blocker of FIG. 3A.

FIGS. 3A-3C are views of a radiation blocker 300 positioned above an exhaust shaft 140 and a radiation shielding grid 302 of the shuttle kiln 100 of FIG. 1A. The radiation blocker 300 (in this embodiment and other embodiments discussed herein) reduces radiation heat transfer through the exhaust shaft 140, thereby increasing energy efficiency (by reducing heat loss by radiation heat transfer through the exhaust shafts 140), and/or increasing temperature uniformity in the shuttle kiln 100 (particularly at the inlet port 143 of the exhaust shaft 140). In certain embodiments, the radiation blocker 300 (with or without radiation shielding grid 302) may result in temperature non-uniformity within ±5° C. Further, the radiation blocker 300 can be easily retrofitted into existing shuttle kilns 100.

In certain embodiments, the radiation blocker 300 includes a radiation shield 301 (may also be referred to herein as a radiation shielding plate, radiation blocking plate, etc.) positioned above the inlet port 143 and/or the outlet port 144 of the exhaust shaft 140 to block line-of-sight radiant heat transfer between (i) any heated surface above the shuttle 104 within the kiln housing 102 and (ii) the outlet port 144 of the exhaust shaft 140. The radiation shielding grid 302 is arranged within the exhaust shaft 140 and extends at least a portion of a length of the exhaust shaft 140 between the inlet port 143 and the outlet port 144. In certain embodiments, the radiation shielding grid 302 extends a distance (e.g., substantially an entire distance) between the inlet port 143 and the outlet port 144 of the exhaust shaft 140. The radiation shielding grid 302 reduces radiant heat transfer between the hot gas in the kiln cavity 138 and the cooler gas in the flue channel 124. In certain embodiments, the radiation shielding grid 302 could be made with a finer grid mesh, with thicker grid lines, and/or with increased height; however, such modifications would tend to increases the pressure drop between the kiln cavity 138 and the flue channel 124 (which can reduce flow through the exhaust shaft 140). Further, any such modifications would still not prevent line-of-sight radiation heat transfer perpendicular to the outlet port 144 of the exhaust shaft 140.

Providing the radiation shield 301 above and offset from the inlet port 143 prevents line-of-sight radiation heat transfer to the outlet port 144 of the exhaust shaft 140 while also avoiding interference with gas flow through the exhaust shaft 140 (without increasing the pressure drop). This increases temperature uniformity within the shuttle kiln 100. As provided below, Equation 1 is directed to the heat transfer between two parallel plates without use of the radiation shield 301, and Equation 2 is directed to the heat transfer between two parallel plates with use of the radiation shield 301.

$$\dot{Q}_{12,no\ shield} = \frac{E_{b1} - E_{b2}}{\frac{1}{\varepsilon_1} + \frac{1}{\varepsilon_2} - 1} \quad \text{Equation 1}$$

$$\dot{Q}_{12,one\ shield} = \frac{E_{b1} - E_{b2}}{\frac{1-\varepsilon_1}{A_1\varepsilon_1} + \frac{1}{A_1F_{12}} + \frac{1-\varepsilon_{3.1}}{A_3\varepsilon_{3.1}} + \frac{1-\varepsilon_{3.2}}{A_3\varepsilon_{3.2}} + \frac{1}{A_3F_{32}} + \frac{1-\varepsilon_2}{A_2\varepsilon_2}} \quad \text{Equation 2}$$

where $F_{ij}$ is a view factor, $E_b$ is a blackbody emissive power, c is emissivity, and A is an area.

Referring to FIG. 3C, the radiation shield 301 includes a projected top area, which is a two-dimensional area of a vertical projection of the radiation shield 301 on a horizontal plane. In certain embodiments, the projected top area is defined by L1 and L2. The projected top area is configured to be at least as large as (and in certain embodiments larger than) a cross-sectional area of the inlet port 143 defined by L3 and L4. In combination with the radiation shielding grid 302, such a configuration prevents any line-of-sight radiation heat transfer between any heated surface above the shuttle 104 within the kiln housing 102 (e.g., support surface 134) and the outlet port 144 of the exhaust shaft 140. It is noted that if the radiation shielding grid 302 were removed, to completely block line-of-sight radiation heat transfer, the projected top area of the radiation shield 301 may have to be increased and/or the offset H1 between the radiation shield 301 and the top 128 of the shuttle 104 may need to be decreased.

To offset the radiation shield 301 from the top 128 of the shuttle 104, the radiation shield 301 may be elevated and/or suspended. For example, in certain embodiments, the radiation shield 301 includes at least one support to elevate the radiation shield 301 above the inlet port 143 of the exhaust shaft 140 of the shuttle 104. In certain embodiments, the radiation shield 301 includes the at least one support attached to the furniture 132 (e.g., support surface 134) on the shuttle 104 to suspend the radiation shield 301 above the inlet port 143 of the exhaust shaft 140 of the shuttle 104.

Figure 4A:
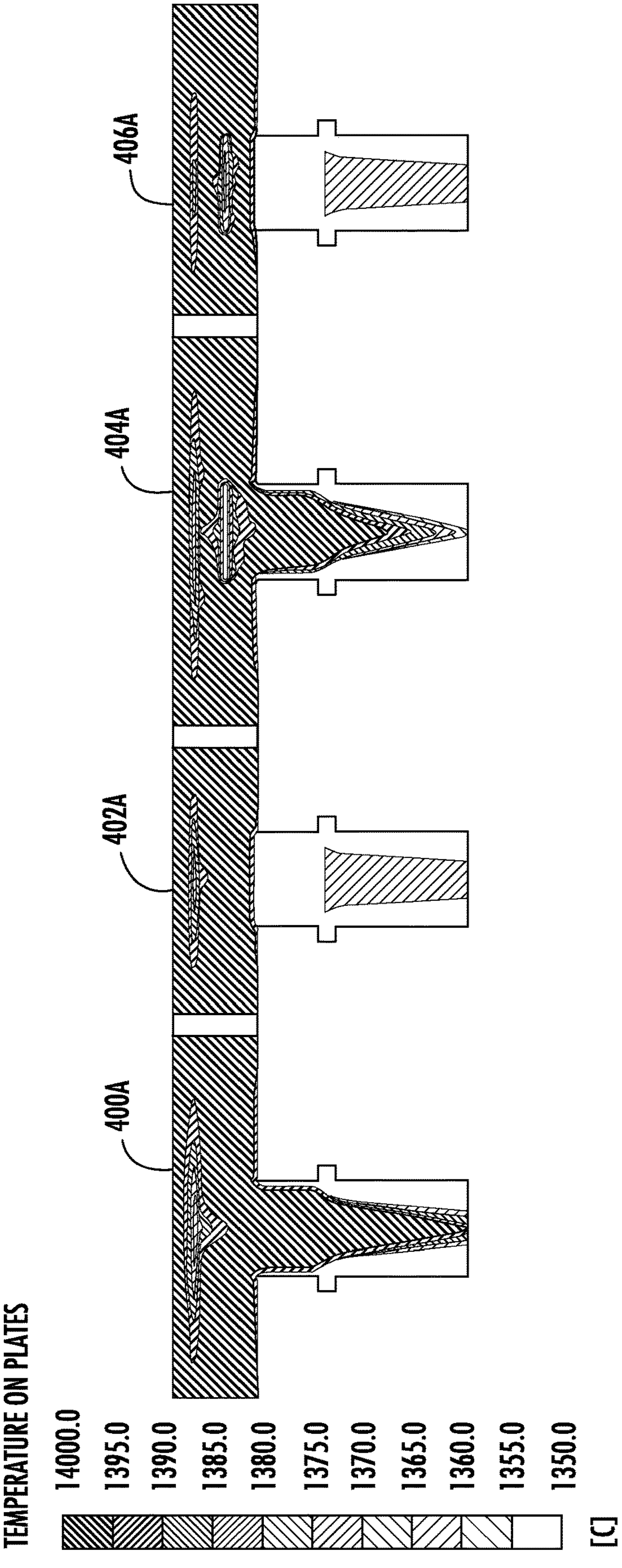
FIG. 4A is a side view illustrating radiation heat loss through the exhaust shaft of the shuttle with and without the radiation shielding grid and/or the radiation blocker.

FIG. 4A is a side view illustrating radiation heat loss through the exhaust shaft 140 of the shuttle 104 with and without the radiation shielding grid 302 and/or the radiation blocker 300. Model 400A illustrates temperature variation without a radiation shield 301 and without the radiation shielding grid 302. Model 402A illustrates temperature variation without the radiation shield 301 and with the radiation shielding grid 302. Model 404A illustrates temperature variation with the radiation shield 301 and without the radiation shielding grid 302. Model 406A illustrates temperature variation with the radiation shield 301 and the radiation shielding grid 302.

As shown, model 400A shows the greatest amount of heat loss. Model 404A shows that the radiation shield 301 by itself reduces the amount of heat loss. Further, model 406A shows the greatest temperature uniformity and the least amount of temperature variation at the support surface 134 of the furniture 132 (which holds the bodies 136).

Figure 4B:
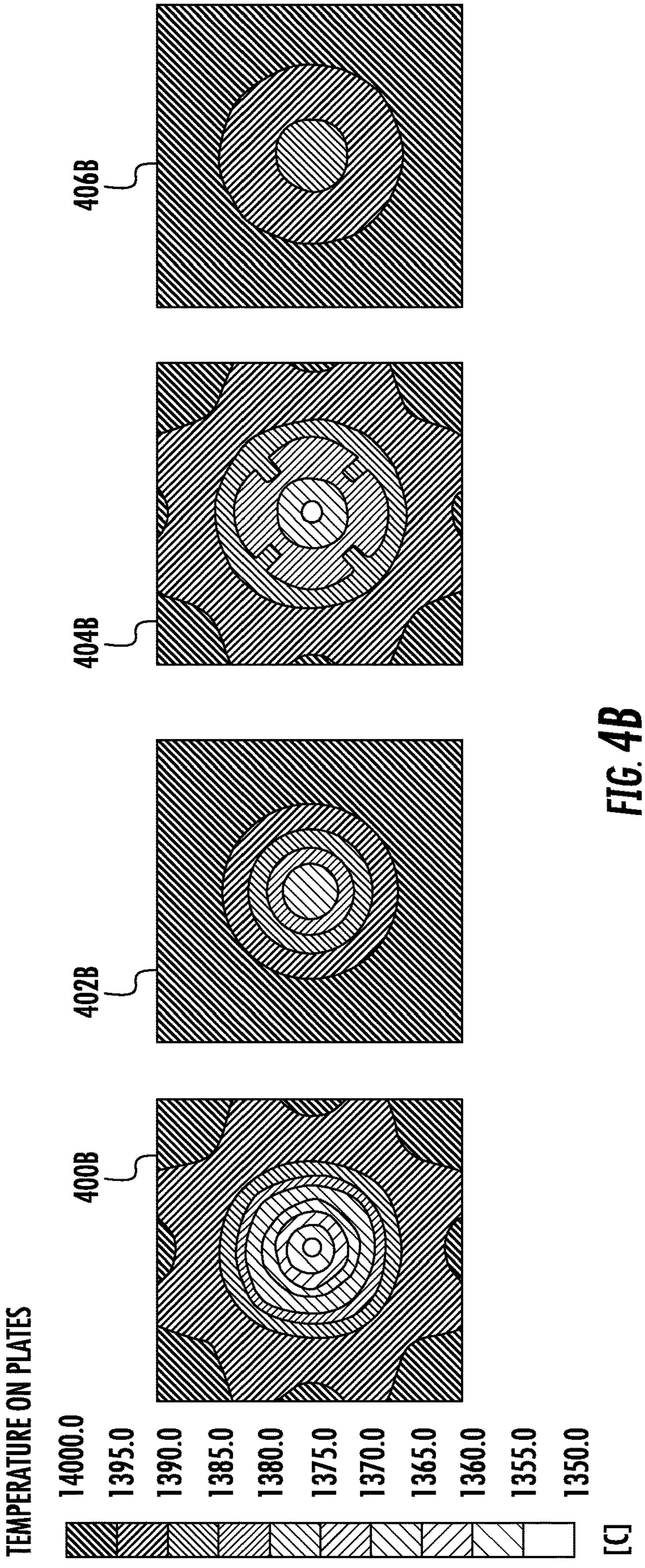
FIG. 4B is a top view illustrating radiation heat loss through the exhaust shaft of the shuttle with and without the radiation shielding grid and/or the radiation blocker.

FIG. 4B is a top view illustrating radiation heat loss through the exhaust shaft 140 of the shuttle 104 with and without the radiation shielding grid 302 and/or the radiation blocker 300. Model 400B illustrates temperature variation without the radiation shield 301 and without the radiation shielding grid 302. Model 400B has an average temperature of 1388° C. and a temperature difference of 40° C. between the center and the edge of the support surface 134 of the furniture 132. Model 402B illustrates temperature variation without the radiation shield 301 and with the radiation shielding grid 302. Model 402B has an average temperature of 1394° C. and a temperature difference of 18° C. between the center and the edge of the support surface 134 of the furniture 132. Model 404B illustrates temperature variation with the radiation shield 301 and without the radiation shielding grid 302. Model 400B has an average temperature of 1390° C. and a temperature difference of 18° C. between the center and the edge of the support surface 134 of the furniture 132. Model 406B illustrates temperature variation with the radiation shield 301 and the radiation shielding grid 302. Model 406B has an average temperature of 1396° C. and a temperature difference of 12° C. between the center and the edge of the support surface 134 of the furniture 132.

Similar to FIG. 4A discussed above, model 400B shows the greatest amount of heat loss. Model 404B shows that the radiation shield 301 by itself reduces the amount of heat loss in the exhaust shaft 140. Model 406B shows the greatest temperature uniformity and the least amount of temperature variation in the exhaust shaft 140.

Figure 4C:
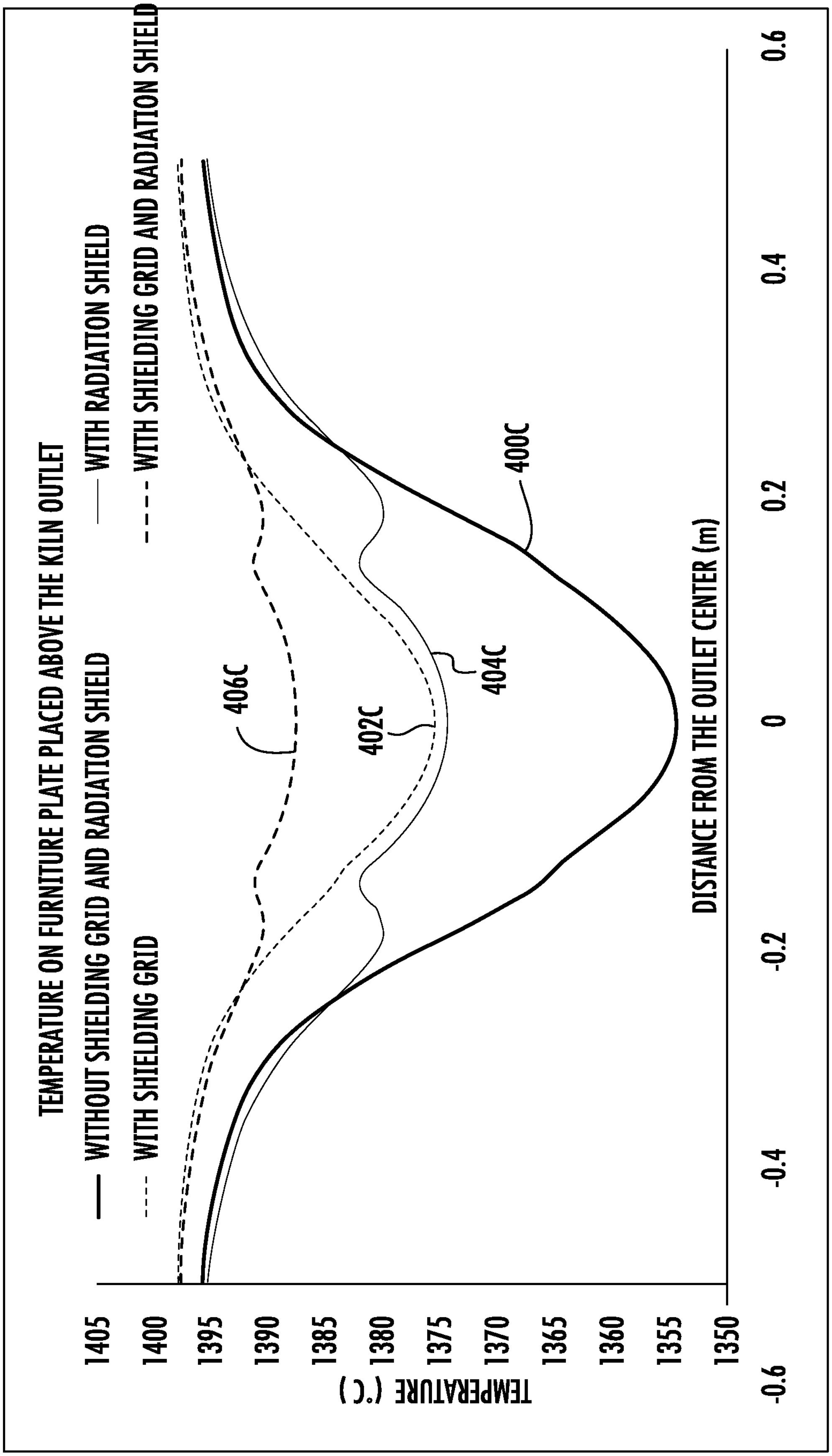
FIG. 4C is a chart illustrating maximum temperature uniformity at the exhaust shaft of the shuttle with and without the radiation shielding grid and/or the radiation blocker.

FIG. 4C is a chart illustrating maximum temperature uniformity at the exhaust shaft 140 of the shuttle 104 with and without the radiation shielding grid 302 and/or the radiation blocker 300. The lines illustrate the temperature variation on the support surface 134 of furniture 132 relative to a distance from a center of the outlet port 144 of the exhaust shaft 140. Line 400C illustrates temperature variation without the radiation shield 301 and without the radiation shielding grid 302. Line 402C illustrates temperature variation without the radiation shield 301 and with the radiation shielding grid 302. Model 404C illustrates temperature variation with the radiation shield 301 and without the radiation shielding grid 302. Model 406C illustrates temperature variation with the radiation shield 301 and the radiation shielding grid 302.

Figure 5:
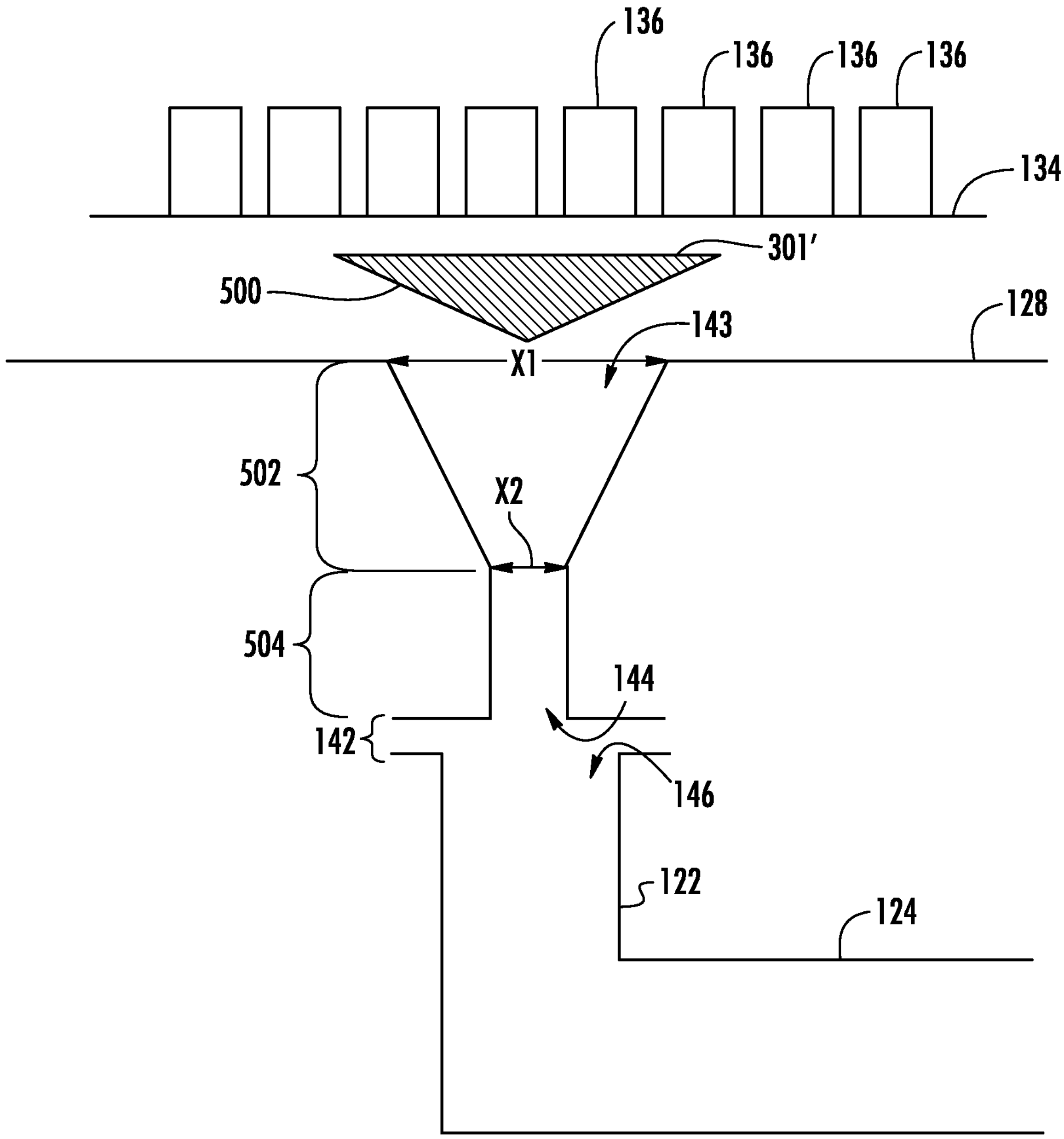
FIG. 5 is a schematic side cross-sectional view of the radiation shield with a tapered bottom surface and the exhaust shaft of the shuttle with a tapered sidewall.

FIG. 5 is a schematic side cross-sectional view of the radiation shield 301' with a tapered bottom surface 500 and the exhaust shaft 140 of the shuttle 104 with a tapered sidewall 502. In certain embodiments, the tapered bottom surface 500 directs the airflow of hot gas downward into the exhaust shaft 140. In certain embodiments, the tapered bottom surface 500 includes a conical or trapezoidal bottom surface. In certain embodiments, the exhaust shaft 140 includes the tapered sidewall 502 and a straight sidewall 504. The tapered sidewall 502 is proximate to the inlet port 143 of the exhaust shaft 140, and the straight sidewall 504 is proximate to the outlet port 144 of the exhaust shaft 140. The tapered sidewall 502 includes a larger diameter X1 proximate to the inlet port 143 and a smaller diameter X2 proximate to the outlet port 144. In certain embodiments, the tapered sidewall 502 includes a conical or trapezoidal sidewall. The tapered bottom surface 500 and/or the tapered sidewall 502 directs the airflow downward and/or reduces the pressure drop from the inlet port 143 to the outlet port 144 of the exhaust shaft 140.

Figure 6A:
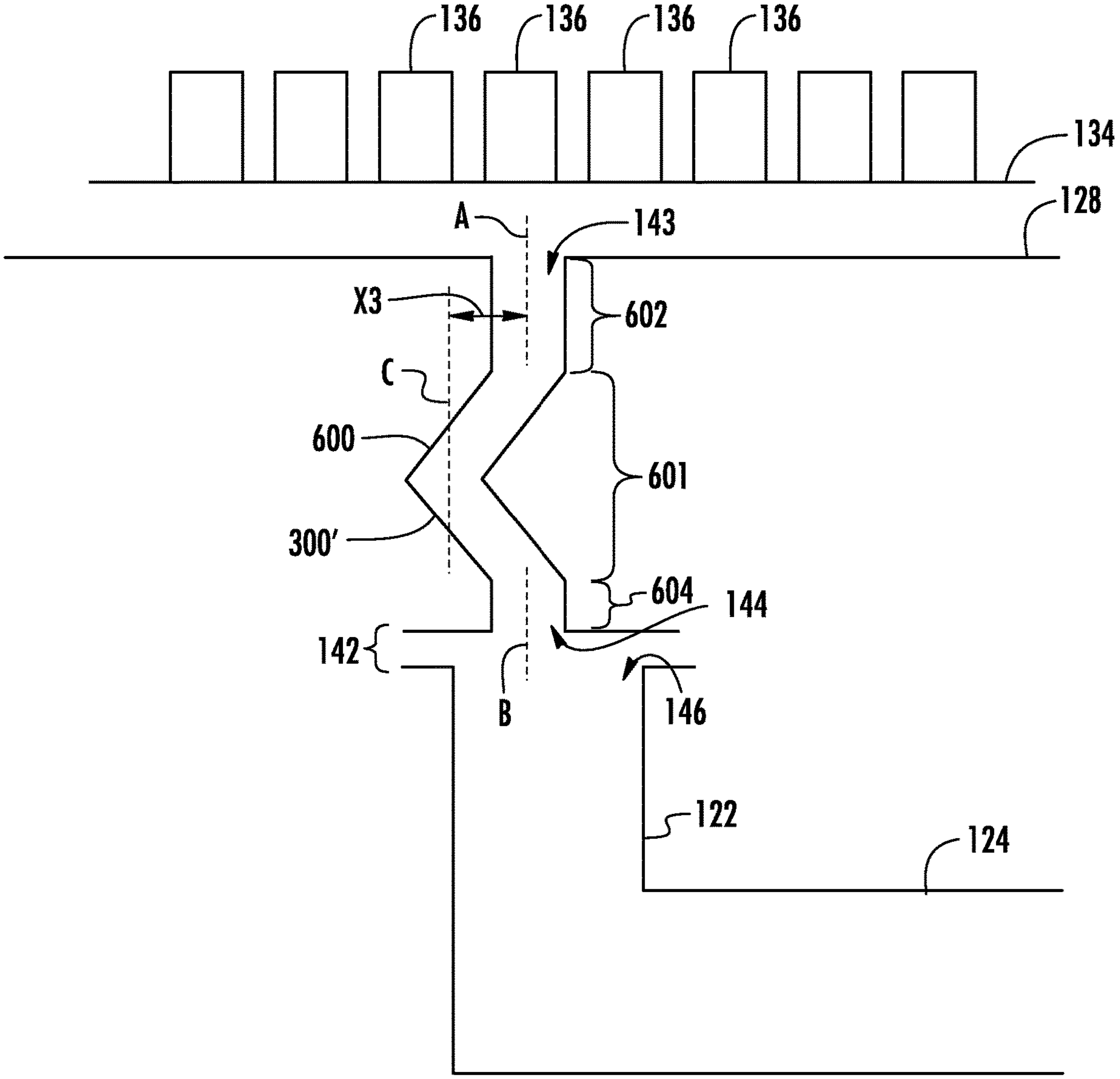
FIG. 6A is a schematic side cross-sectional view of a radiation blocker including a shielding wall portion having a bend in the exhaust shaft of the shuttle.

FIG. 6A is a schematic side cross-sectional view of a radiation blocker 300' including a shielding wall portion 600 having a bend 601 in the exhaust shaft 140 of the shuttle 104. In other words, the shielding wall portion 600 defines the bend 601 in the at least one exhaust shaft 140. The exhaust shaft 140 includes an upper straight sidewall 602 (proximate to the inlet port 143), lower straight sidewall 604 (proximate to the outlet port 144), and the bend 601 therebetween. The shielding wall portion 600 is non-perpendicular to a top 128 (i.e., an upper surface) of the shuttle 104. Further, the shielding wall portion 600 is angled relative to the upper straight sidewall 602 and/or the lower straight sidewall 604. However, it is noted that in certain embodiments, the exhaust shaft 140 may include only the bend 601 without including the upper straight sidewall 602 and/or the lower straight sidewall 604.

The upper straight sidewall 602 defines a center axis A, and the lower straight sidewall 604 defines a center axis B aligned with the center axis A. The outermost portion of the bend 601 defines a center axis C that is offset from the center axis A and the center axis B by a distance X3. This offset prevents line-of-sight radiation heat transfer between the inlet port 143 and the outlet port 144 of the exhaust shaft 140.

Figure 6B:
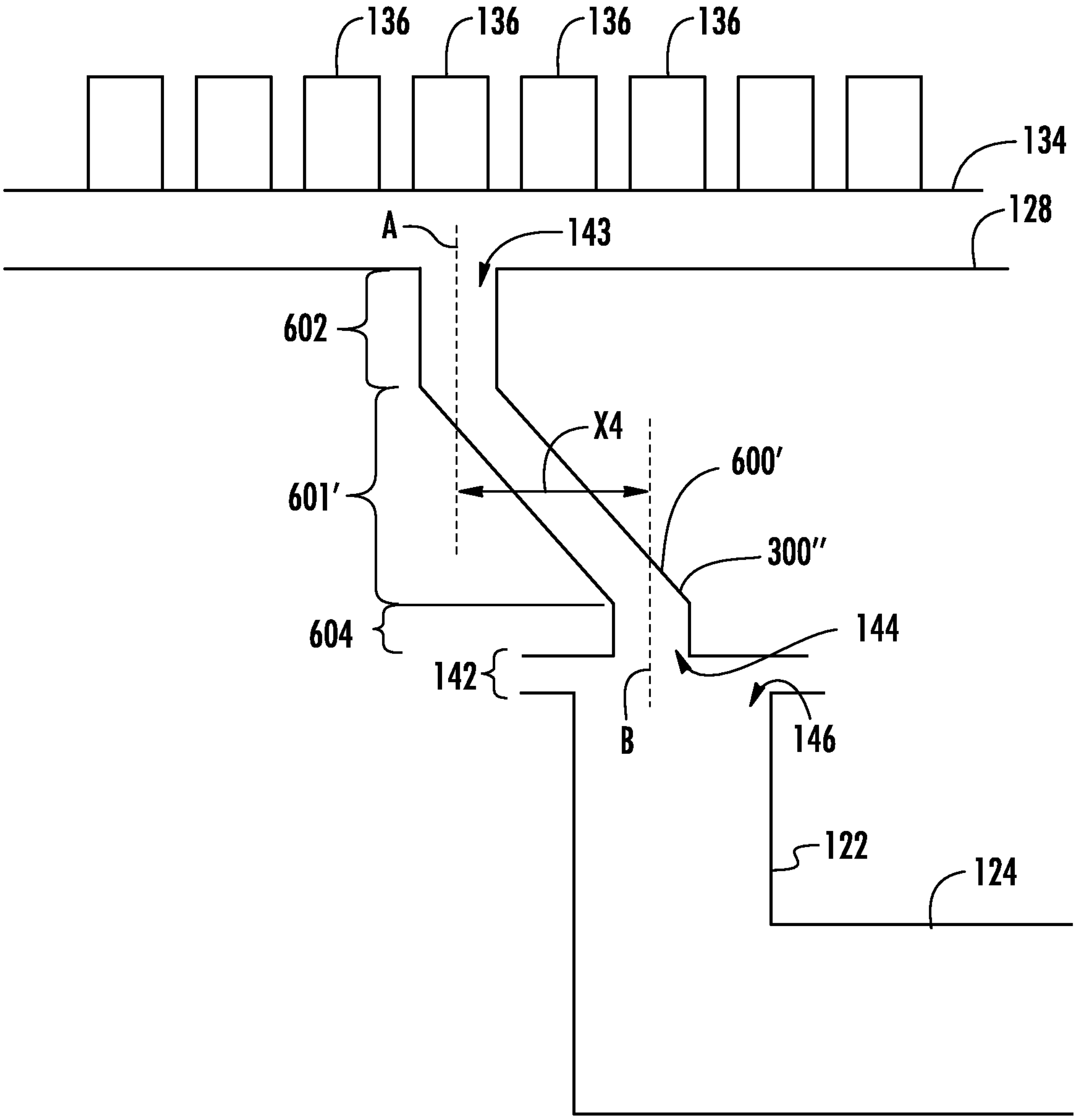
FIG. 6B is a schematic side cross-sectional view of a radiation blocker including the shielding wall portion having an offset between an inlet port and an outlet port of the exhaust shaft of the shuttle.

FIG. 6B is a schematic side cross-sectional view of a radiation blocker 300" including an offset between the inlet port 143 and the outlet port 144 of the exhaust shaft 140 of the shuttle 104. In other words, the shielding wall portion 600' defines an angled sidewall 601' in the at least one exhaust shaft 140 to cause the outlet port 144 to be offset relative to the inlet port 143. The exhaust shaft 140 includes an upper straight sidewall 602 (proximate to the inlet port 143), lower straight sidewall 604 (proximate to the outlet port 144), and an angled sidewall 601' therebetween. The shielding wall portion 600' is non-perpendicular to a top 128 (i.e., an upper surface) of the shuttle 104. The shielding wall portion 600' is also angled relative to the upper straight sidewall 602 and/or the lower straight sidewall 604. However, in certain embodiments, the exhaust shaft 140 may include only the angled sidewall 601' without including the upper straight sidewall 602 and/or the lower straight sidewall 604.

The upper straight sidewall 602 defines a center axis A, and the lower straight sidewall 604 defines a center axis B that is not aligned with the center axis A and offset therefrom by a distance X4. The outlet port 144 is laterally offset relative to the inlet port 143. This lateral offset prevents line-of-sight radiation heat transfer between the inlet port 143 and the outlet port 144 of the exhaust shaft 140.

Figure 7:
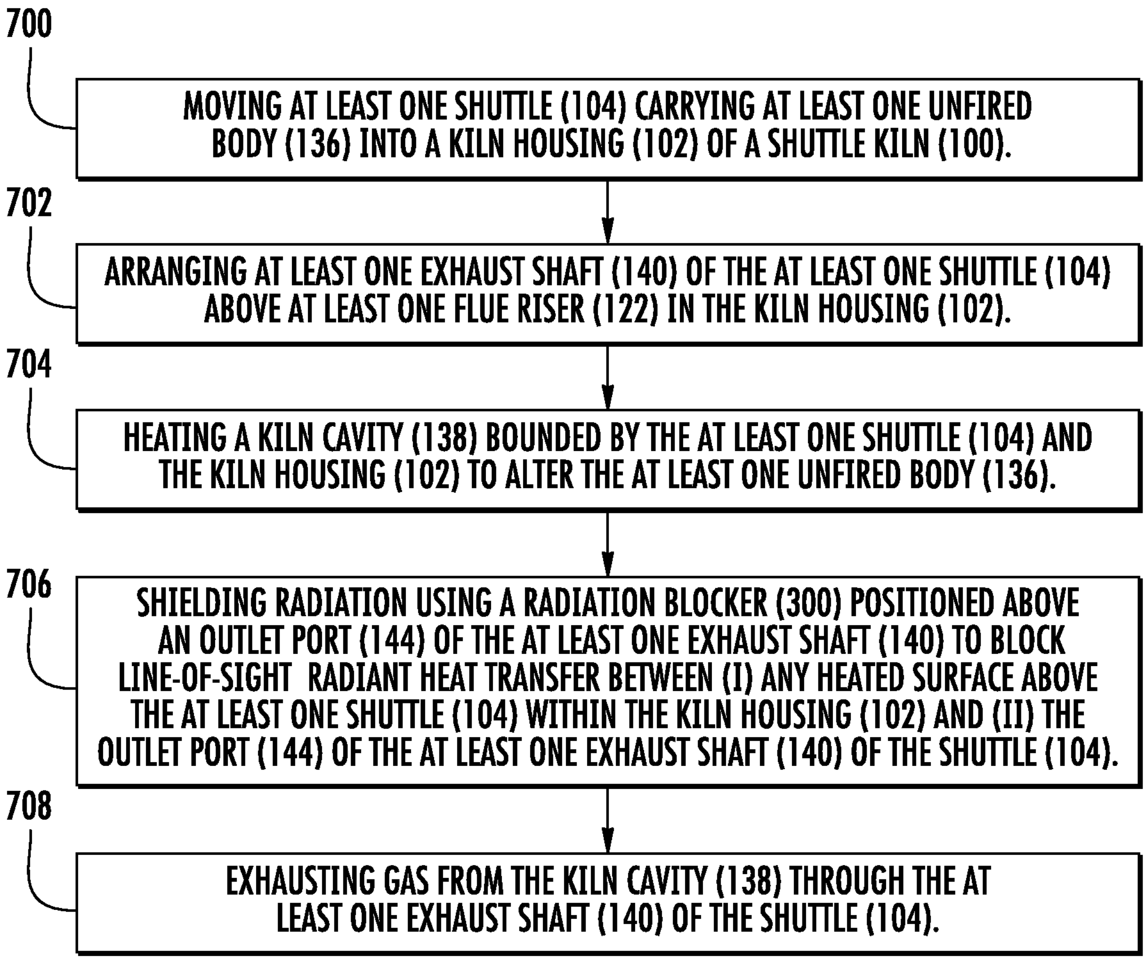
FIG. 7 is a flowchart illustrating of a method of fabricating at least one fired body.

FIG. 7 is a flowchart illustrating steps of a method for fabricating at least one fired body 136. According to step 700, at least one shuttle 104 carrying at least one unfired body 136 is moved into the kiln housing 102 of a shuttle kiln 100. According to step 702, at least one exhaust shaft 140 of the at least one shuttle 104 is arranged above at least one flue riser 122 in the kiln housing 102. According to step 704, the kiln cavity 138 bounded by the at least one shuttle 104 and the kiln housing 102 is heated to alter the at least one unfired body 136. According to step 706, radiation is shielded using the radiation blocker 300 positioned above the outlet port 144 of the at least one exhaust shaft 140 to block line-of-sight radiant heat transfer between (i) any heated surface above the at least one shuttle 104 within the kiln housing 102 and (ii) the outlet port 144 of the at least one exhaust shaft 140 of the shuttle 104. According to step 708, gas is exhausted from the kiln cavity 138 through the at least one exhaust shaft 140 of the shuttle 104.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A shuttle kiln, comprising:

a shuttle configured to be removably positioned within an interior of a kiln housing and comprising at least one exhaust shaft having an inlet port and an outlet port arranged below the inlet port, the at least one exhaust shaft configured to be positioned above and in fluid communication with at least one flue riser of the kiln housing, and the at least one exhaust shaft configured to be separated from the at least one flue riser to define an entrainment gap therebetween; and a radiation blocker positioned above the outlet port of the at least one exhaust shaft to block line-of-sight radiant heat transfer between (i) any heated surface above the shuttle within the kiln housing and (ii) the outlet port of the at least one exhaust shaft, and wherein the radiation blocker comprises at least one radiation shield positioned above the inlet port of the at least one exhaust shaft of the shuttle.

2. The shuttle kiln of claim 1, wherein the kiln housing comprises at least one flue channel and the at least one flue riser is in fluid communication with the at least one flue channel.

3. The shuttle kiln of claim 2, wherein:

the kiln housing comprises a floor, a door, sidewalls, and a ceiling bounding the interior;

the at least one flue channel is arranged below a top surface of the floor; and the at least one flue riser extends above the top surface of the floor.

4. The shuttle kiln of claim 2, wherein at least a portion of the at least one exhaust shaft is vertically aligned with the at least one flue riser.

5. The shuttle kiln of claim 1, further comprising furniture positioned on the shuttle and defining a plurality of support surfaces configured to support a plurality of unfired bodies to be fired within the shuttle kiln.

6. The shuttle kiln of claim 1, further comprising at least one radiation shielding grid arranged within the at least one exhaust shaft.

7. The shuttle kiln of claim 6, wherein the at least one radiation shielding grid extends between the inlet port and the outlet port of the at least one exhaust shaft.

8. The shuttle kiln of claim 1, wherein at least a portion of the at least one exhaust shaft comprises a tapered sidewall proximate to the inlet port.

9. The shuttle kiln of claim 1, wherein the radiation blocker further comprises at least one support to elevate the at least one radiation shield above the inlet port of the at least one exhaust shaft of the shuttle.

10. The shuttle kiln of claim 1, wherein the radiation blocker further comprises at least one support attached to furniture positioned on the shuttle to suspend the at least one radiation shield above the inlet port of the at least one exhaust shaft of the shuttle.

11. The shuttle kiln of claim 1, wherein a projected top area of the at least one radiation shield is at least as large as a cross-sectional area of the inlet port of the at least one exhaust shaft of the shuttle.

12. The shuttle kiln of claim 1, wherein a projected top area of the at least one radiation shield is in a range from 0.09 $m^2$ to 0.21 $m^2$; and wherein a cross-sectional area of the inlet port of the at least one exhaust shaft of the shuttle is in a range from 0.09 $m^2$ to 0.21 $m^2$.

13. The shuttle kiln of claim 1, wherein the at least one radiation shield comprises a tapered bottom surface.

14. The shuttle kiln of claim 1, wherein the at least one radiation shield comprises a conical or trapezoidal bottom surface.

* * * * *